United States Patent [19]

Perreault

[11] 4,208,562
[45] Jun. 17, 1980

[54] CAVITY FEED SYSTEM

[75] Inventor: Henry W. Perreault, Chelmsford, Mass.

[73] Assignee: Raytheon Company, Lexington, Mass.

[21] Appl. No.: 962,492

[22] Filed: Nov. 17, 1978

[51] Int. Cl.² ............................................. H05B 9/06
[52] U.S. Cl. ...................... 219/10.55 R; 219/10.55 F; 425/174.4; 264/26
[58] Field of Search ................. 219/10.55 R, 10.55 F, 219/10.55 A, 10.55 M; 425/41, 174.2, 174.4; 264/26; 156/272, 273, 274

[56] References Cited

U.S. PATENT DOCUMENTS

| | | | |
|---|---|---|---|
| 2,738,406 | 3/1956 | Zaleski | 219/10.55 R |
| 2,763,757 | 9/1956 | Pritchard | 219/10.55 F |
| 3,742,394 | 6/1973 | VanKoughnett et al. | 219/10.55 A X |
| 3,745,291 | 7/1973 | Peterson et al. | 219/10.55 R |
| 3,898,411 | 8/1975 | Smeets | 219/10.55 R |
| 3,980,855 | 9/1976 | Boudouris et al. | 219/10.55 A |
| 4,028,521 | 6/1977 | Uyeda et al. | 219/10.55 F |
| 4,067,683 | 1/1978 | Klaila | 219/10.55 R X |
| 4,123,306 | 10/1978 | Landry | 219/10.55 R X |

FOREIGN PATENT DOCUMENTS 2750923 5/1978 Fed. Rep. of Germany .... 219/10.55 F

*Primary Examiner*—B. A. Reynolds
*Assistant Examiner*—Philip A. Leung
*Attorney, Agent, or Firm*—David M. Warren; Joseph D. Pannone; Milton D. Bartlett

[57] ABSTRACT

A system for feeding electromagnetic energy into a cavity for heating material contained therein includes a radiator of the electromagnetic energy and a motorized support for carrying the radiator within the cavity by the material. The radiator is constructed of a material such as alumina providing a much shorter wavelength than that existing in the environment surrounding the material to permit the radiator to have a sufficiently small size to be inserted within the cavity. Heat may also be provided by directly heating the walls of the cavity in which case the radiator is provided with a taper for directing the electromagnetic energy into the thicker portions of the material so that all portions of the material are heated at a uniform rate. The feed system includes a support for a bladder which is useful in urging uncured rubber of a tire casing against the interior surface of the cavity for forming a rubber tire.

5 Claims, 7 Drawing Figures

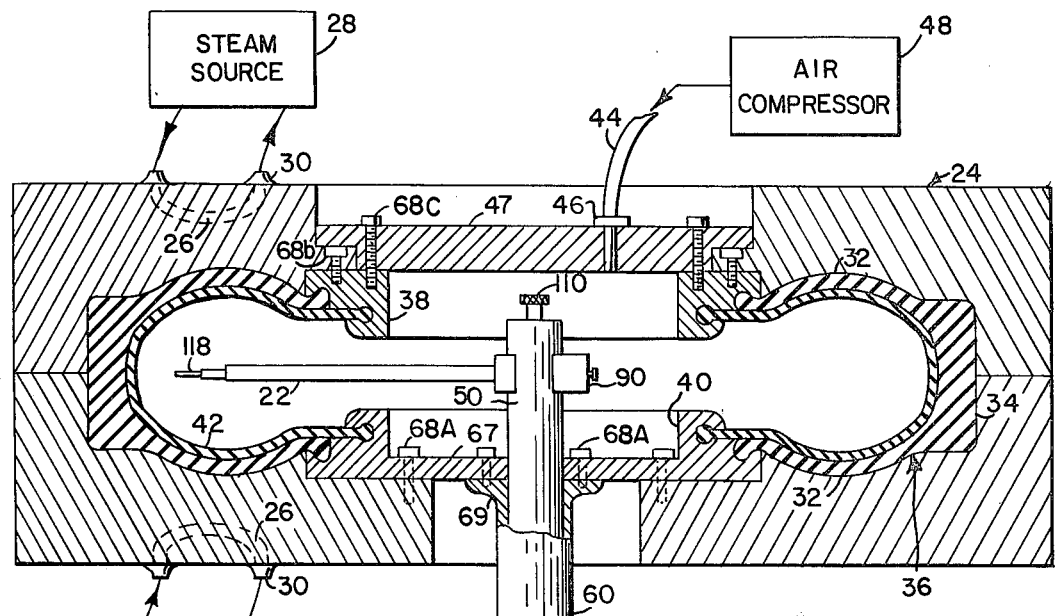
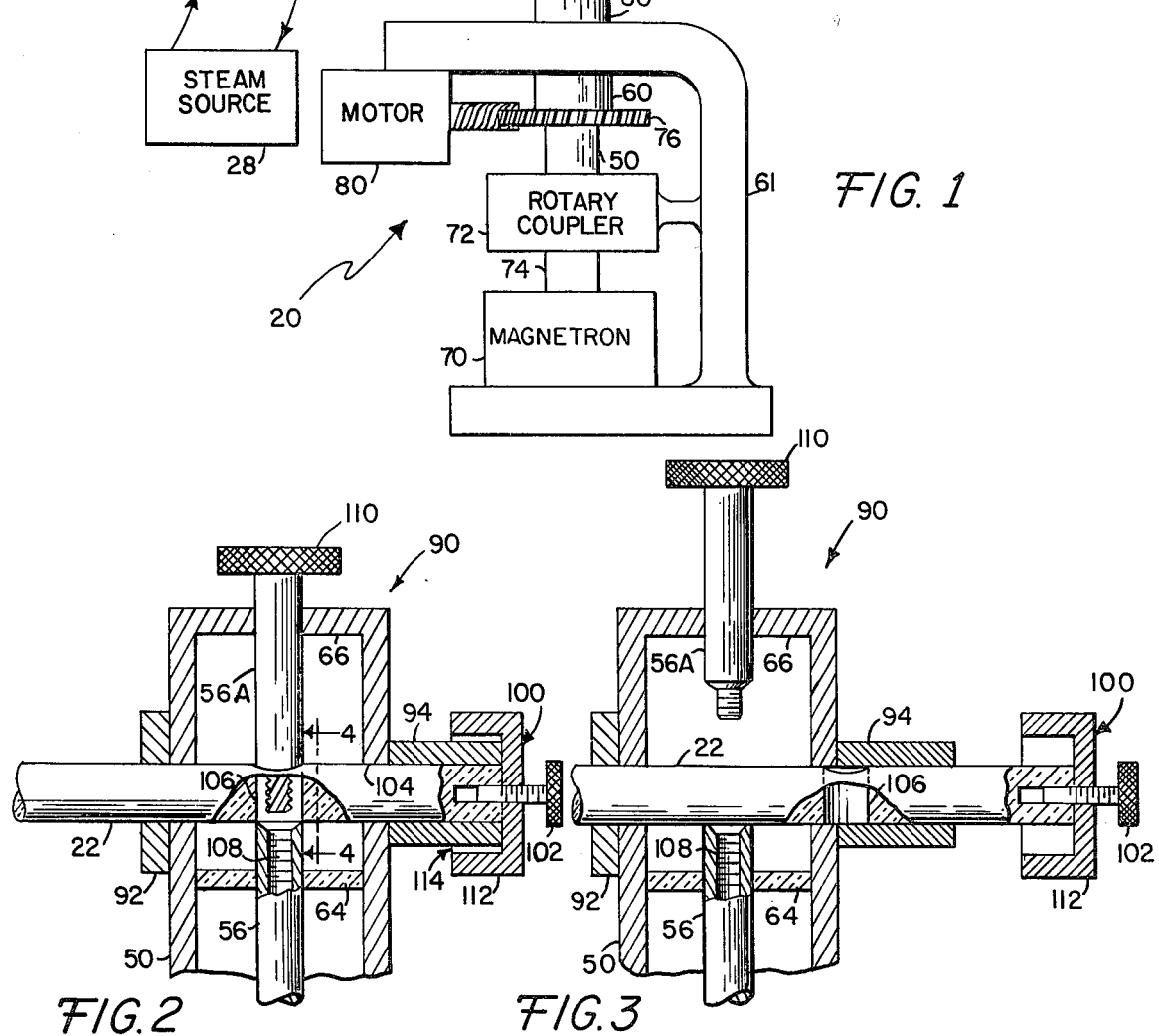
FIG. 1
FIG. 2   FIG. 3

CAVITY FEED SYSTEM

BACKGROUND OF THE INVENTION

This invention relates to the heating of materials within a cavity by use of electromagnetic energy and, more particularly, to an electromagnetic feed system for vulcanizing rubber tires in a mold.

Rubber tires are employed on a variety of vehicles ranging in size from the relatively small automobiles to the relatively large earth moving equipments. While the thickness of the side walls of rubber tires is sufficiently thin to admit a uniform heating of the side walls by the conduction of heat thereto from the heated walls of a mold, the tread region of such tires, particularly the larger tires of earth moving equipments, is very much thicker with the result that the thermal insulating properties of the rubber greatly reduce the amount of heat conducted into the interior portions of the tread as compared to the amount of heat conducted into the exterior portions of the tread contiguous to a heated wall of the cavity.

One approach to the acceleration of the vulcanizing process is the use of microwave energy for heating the rubber. As is well known, microwave energy has been utilized for heating a large number of substances, and has found extensive use in microwave ovens for heating food. A problem arises in the use of microwave energy in an enclosed metallic cavity in that standing waves of reflected energy introduce local variations in the intensity of the energy with the result that non-uniform heating of the material in the cavity results. While devices such as mode stirrers comprising moving reflecting elements may be employed in microwave ovens, such devices are impractical within the metallic mold utilized in forming a tire because of the intricate shape of the mold as well as the fact that a substantially large portion of the cavity is filled with the material, namely the rubber, which is to be heated.

One attempt at the solution of the foregoing problem by the utilization of microwave energy for heating material contained in a metallic cavity, such as the heating of a rubber tire, is disclosed in the U.S. Pat. No. 2,738,406 which issued in the name of Zaleski on Mar. 13, 1956. Therein, microwave energy is introduced via a tortuous path following a metallic surface of an air bladder utilized in inflating the tire against the inner surface of the mold. A problem arises therein in that it is difficult to maintain a uniform intensity of electromagnetic power since the power is progressively attenuated by the rubber as the radiant energy propagates along the tortuous path.

An additional problem becomes evident when an attempt is made to direct electromagnetic energy into the cavity by a radiation thereof. The wavelength of electromagnetic energy utilized in heating operations is generally greater than or equal to approximately 15 centimeters. Accordingly, a waveguide of suitable dimensions to propagate such radiant energy would be difficult to place within the smaller tire molds due to a lack of space. And even in the case of a larger tire molds, if it be desired to produce a radiator having a radiating aperture of many wavelengths to produce a highly directive beam of radiant energy, there would be a lack of space so that typical radiation patterns associated with the far field of a radiator could not be accommodated.

SUMMARY OF THE INVENTION

The aforementioned problems are overcome and other advantages are provided by a cavity feed system for heating material within a cavity, the feed system comprising in accordance with the invention, a radiator and a motorized transport for transporting the radiator within the cavity and along the material for directing radiant energy in preferred directions through the material to accomplish a uniform heating thereof. In a preferred embodiment of the invention, the radiator is formed of a material having a relatively high dielectric constant, such as alumina having a relative permittivity of approximately ten, to reduce the wavelength within the material of the radiator by a factor of approximately three from that of the free space within the cavity. Thereby, the radiant energy can be readily propagated from a central point of the feed system to the radiating aperture of the radiator.

In an embodiment of the invention wherein the heating is employed for the vulcanizing of a rubber tire, the tire forming mold is formed of a metal, typically steel and is heated, typically by steam, to provide for the conduction of heat into the rubber tire. The feed system includes a support for a bladder which is placed within the rubber tire and inflated to urge the rubber against the inner surface of the mold for forming the tire. Due to the cylindrical symmetry of the mold about a central axis thereof, the radiator transport is conveniently fabricated by a coaxial shaft located along the axis and terminated by a matching structure at the junction of the shaft and the radiator. The matching structure provides for the matching of the impedance seen by the radiator to that of the coaxial shaft. The radiator extends radially outward toward the interior surface of the tire tread and may be elongated in a longitudinal plane containing the axis so as to uniformly illuminate the interior surface of the tread. Relatively little internal reflection of electromagnetic energy results from the metallic walls of the tire mold because of the attenuation of the electromagnetic energy and its conversion into heat by the rubber of the tire tread. Regions of the tread distant from the radiator are heated by conduction from the walls of the mold to produce a substantially uniform heating of the tire tread as the radiator is rotated about the coaxial shaft.

BRIEF DESCRIPTION OF THE DRAWINGS

The aforementioned aspects and other features of the invention are explained in the following description taken in connection with the accompanying drawings wherein:

FIG. 1 is an sectional view of a tire mold having a tire casing therein, the figure showing a rotating radiator of the feed system of the invention located within the tire mold;

FIG. 2 is enlarged view of the lower terminus of a coaxial shaft of the feed system of FIG. 1, the shaft supporting the radiator and conducting electromagnetic energy thereto;

FIG. 3 is a further view of the lower terminus of the coaxial shaft of FIG. 2 showing a sidewise displacement of the radiator to facilitate the emplacement of the feed system within the tire casing of FIG. 1;

DESCRIPTION OF THE PREFERRED EMBODIMENT

Figure 4:
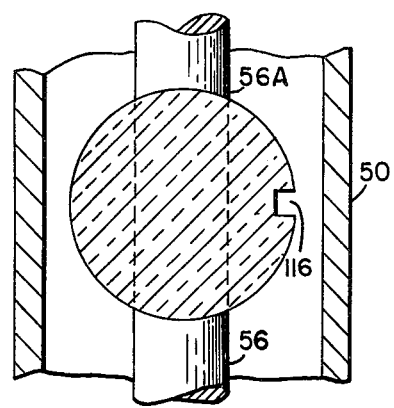
FIG. 4 is a sectional view taken along the lines 4—4 of FIG. 2 showing a cross section of the radiator.

Referring now to FIG. 1, there is seen a system 20 for feeding electromagnetic energy at microwave frequencies via a radiator 22 into a cavity having the form of a tire mold 24. The mold 24 is fabricated from metal, such as steel, and includes channels 26 whereby steam is passed from a source 28 by hoses 30 for heating the mold 24. The interior surface of the mold 24 is provided with a predetermined form for shaping the side walls 32 and the tread 34 of a rubber tire 36. The system 20 includes upper and lower support rings 38 and 40 for positioning a bladder 42 within the tire 36. The bladder 42 may be made of rubber and is sufficiently thin to permit the propagation of electromagnetic energy therethrough without substantial attenuation. An air hose 44 coupled via a valve 46 in a cover plate 47 conducts air from a compressor 48 into the bladder 42 for forceably inflating the bladder 42 against the interior of the tire 36 to urge the tire against the interior surface of the mold 24 to form the tire 36.

Referring also to FIGS. 2–5, the system 20 comprises a hollow shaft 50 which is constructed of an electrically conducting material, such as copper, and includes an inner conductor in the form of a copper rod 56 to provide a coaxial structure which communicates microwave energy to the radiator 22. An outer sleeve 60 secures the shaft 50 to a support 61 and connects with the shaft 50 via a bearing 62, shown diagrammatically in FIG. 5, which permits rotation of the shaft 50 relative to the sleeve 60 and the support 61. The rod 56 is supported by a pair of discs 64 of low loss dielectric material. An end portion of the rod, identified by the legend 56A, passes through and is positioned at its upper terminus by a shorting plate 66 which is located at an electrical length of one-quarter wavelength below the radiator 22.

The rings 38 and 40 are secured to the mold 24 in a manner which permits ready access to the tire 36. The lower ring 40 is formed integrally with an annular plate 67 which is secured by bolts 68A to the mold 24 and to a flange 69 on the upper end of the sleeve 60. The upper ring 38 is secured to the mold 24 by bolts 68B which are countersunk within a flange of the mold 24 beneath the rim of the cover plate 47. The bolts 68B serve to align the ring 38 with the mold 24 to permit the facile securing of the plate 47 to the ring 38 and mold 24 by bolts 68C. As is well known, the mold 24 is fabricated in sections to permit disassembly for encasing and delivery of the tire 36.

Figure 5:
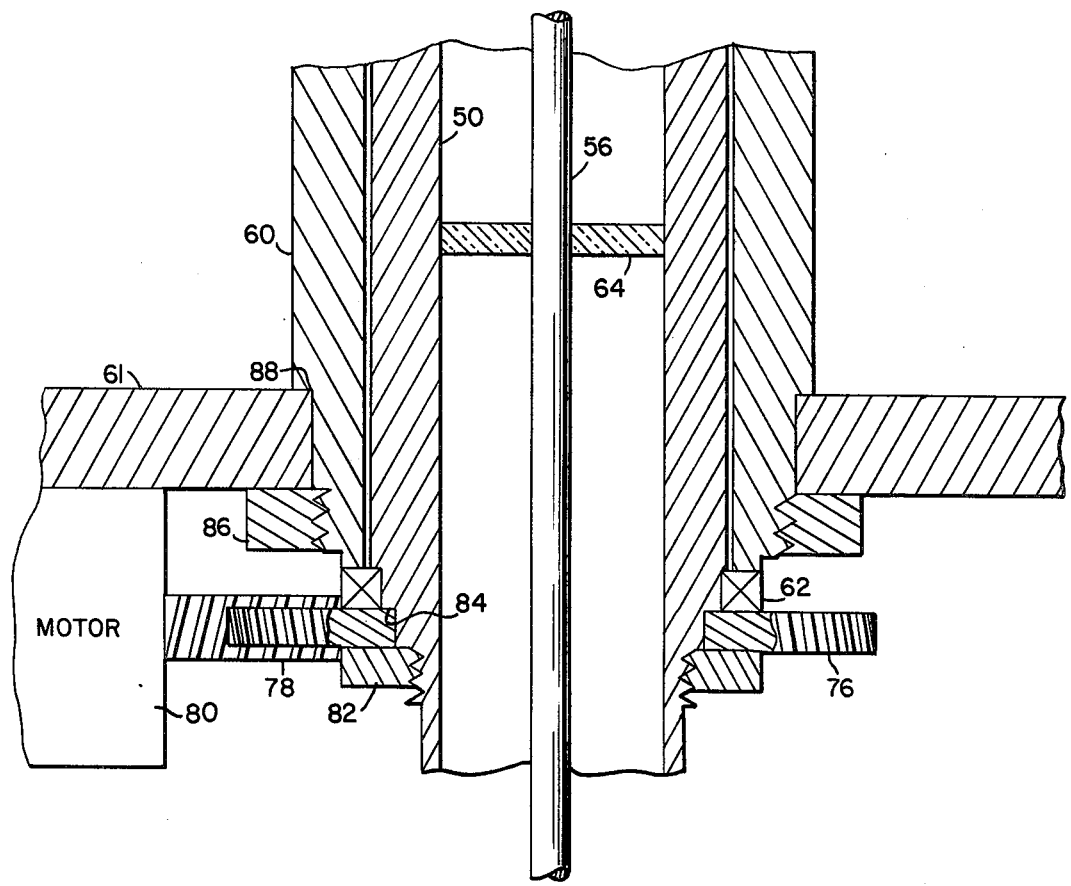
FIG. 5 is an enlarged view of the upper terminus of the coaxial shaft showing the connection of the drive motor to a gear affixed thereto.

The support 61 positions a source of microwave electromagnetic energy, such as a magnetron 70, and a rotary coupler 72 below the shaft 50 for directing the energy into the shaft 50. The output port of the magnetron 20 is in the form of a coaxial transmission line 74, the coupler 72 being of conventional design for coupling electromagnetic energy from the stationary coaxial transmission line 74 to the rotatable coaxial transmission line of the shaft 50. A gear 76 affixed to the shaft 50 is driven through a worm 78 by a motor 80, located on the support 61, for imparting rotation to the shaft 50. As seen in FIG. 5, the gear 76 is secured in an exemplary fashion by a threaded ring nut 82 and a shelf 84 machined into outer surface of the shaft 50, a similar arrangement being shown for the securing of the sleeve 60 to the support 61 by a nut 86 and shelf 88.

To facilitate the positioning of the tire 36 and the bladder 42 about the radiator 22, the upper end of the shaft 50 is provided with a housing 90 which permits the radiator 22 to be displaced along its longitudinal axis as the radiator 22 is supported by the shaft 50. The housing 90 comprises circular bosses 92 and 94 in diametrically opposed positions on the shaft 50 to provide guiding surfaces along which the radiator 22 may be slidably translated. In addition, the housing 90 includes a cap 100 which is constructed of an electrically conductive material such as copper. The cap 100 is adhesively secured to an end of the radiator 22 and contains a tuning screw 102 which is adjustably threaded into an end of the radiator 22. The cap 100 serves as a shorting plate and is positioned in electrical contact with the boss 94 at an electrical length equal to an even number of quarter wavelengths of the electromagnetic energy from the inner surface of the shaft 50 for reflecting a short circuit at an opening 104 in the wall of the shaft 50. In a similar fashion, the shorting plate 66 provides an impedance which is reflected back to the surface of the radiator 22 as an open circuit. Thereby, electromagnetic energy propagating along the coaxial structure of the shaft 50 is efficiently coupled to the radiator 22. The tuning screw 102 permits adjustment of the impedance reflected back to the sleeve 50 by the cap 100 to compensate for changes in impedance presented by different tires 36 to the radiating aperture at the outer end of the radiator 22.

The rod 56A is manually inserted through the plate 66 and a circular channel 106 in the radiator 22 to mate with the rod 56. The rod 56A has a lower terminus which is threadedly secured within a threaded mating section 108 in the rod 56 by turning a knob 110 at the upper end of the rod 56A. The mating section 108 permits the passage of microwave power and current along the shaft 50 through the radiator 22. Withdrawal of the rod 56A, as seen in FIG. 3, permits the sliding of the radiator 22 along the bosses 92 and 94 to facilitate the insertion of the radiator 22 into the tire 36 and the withdrawal of the radiator 22 from the tire 36 of FIG. 1. Insertion of the rod 56A secures the radiator 22 and its cap 100 in their respective positions. The cap 100 may be provided with a skirt 112 which is spaced apart from the outer surface of the boss 94 to provide a quarter-wave choke 114 (seen in FIG. 2), which reflects an open circuit at the edge of the skirt 112 to appear as a short circuit at the junction of the cap 100 and the boss 94. Also, a keyway 116 may be provided along the radiator 22 as shown in FIG. 4 to maintain the channel 106 vertically aligned during the sliding of the radiator 22 to facilitate engagement of the channel 106 with the rod 56A. The depth of the keyway 116 is much smaller than a wavelength of the radiation in the radiator 22 so as to have no more than a negligible effect on the propagation of the radiation.

The radiator 22 is shown in FIG. 1 as having the general shape of elongated rod and, as seen in FIG. 4, is provided with a circular cross section. The radiator 22 is fabricated from a low loss material of relatively high dielectric constant such as alumina which has a dielectric constant that is greater than that of air by a factor of approximately ten. Thus, the radiator 22 serves as a waveguide with the electromagnetic energy propagating therethrough by internal reflection at the interface between the surface of the radiator 22 and the surrounding air. A relatively sharp discontinuity in the surface at the outer end of the radiator 22 diminishes the internal reflection so that the electromagnetic energy propagates through the outer end of the radiator 22 and is thereby directed to the vicinity of the tread 34 of the tire 36. Other discontinuities 118 may be provided in the surface of the radiator 22 to serve as additional sites of radiation for shaping the near field radiation pattern of the radiator 22.

Figure 7:
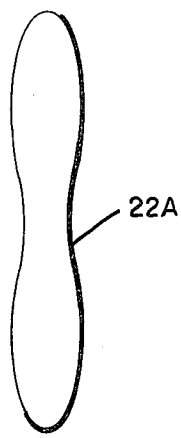
FIG. 7 is a view of the radiating aperture of the radiator of FIG. 6, taken along the lines 7—7 in FIG. 6.
Figure 6:
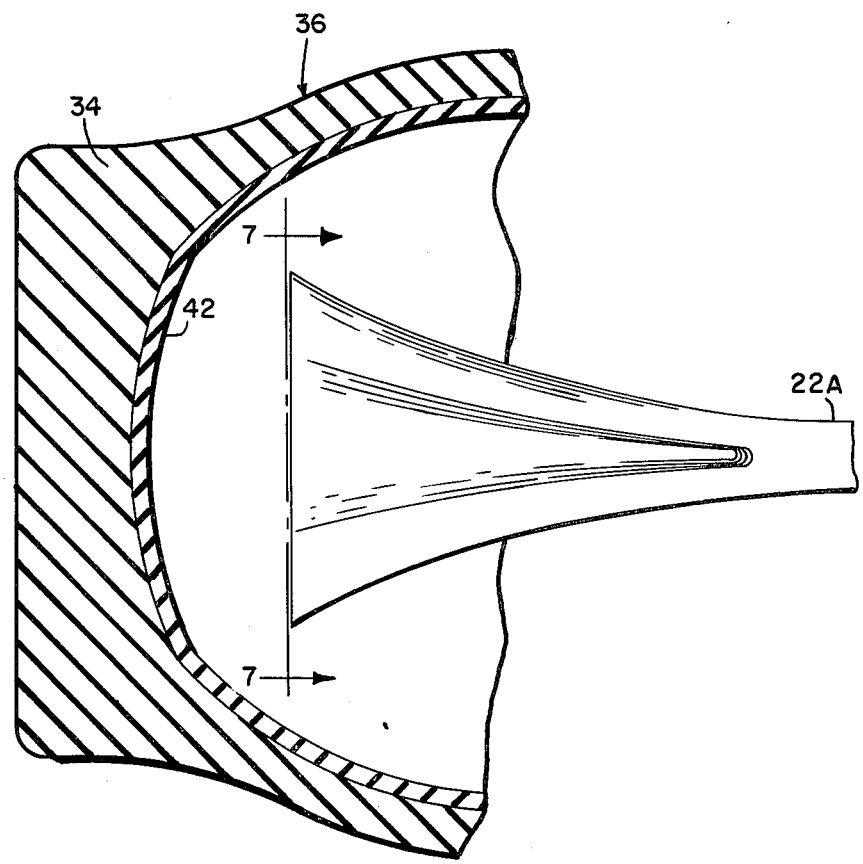
FIG. 6 shows an alternative embodiment of an end portion of the radiator of FIG. 1; the end portion being provided with a flare for uniformly illuminating the interior surface of the tread portion of the tire.

Referring to FIGS. 6 and 7, there is seen an alternative embodiment of the radiator 22 of FIG. 1, the alternative embodiment being identified by the legend 22A. The outer end of the radiator 22A is seen to flare from the circular cross section to an elongated cross section to produce a radiating aperture which substantially covers the full width of the tread 34. By way of example, the radiating aperture is seen to be tapered as shown in FIG. 7, so that the mid portion is somewhat narrower than the end portions to compensate for variations of intensity of the electromagnetic power in the flared portion of the radiator 22A to result in a uniform distribution of radiant energy along the tread 34 of the tire 36. Due to the enlarged size of the radiating aperture of the radiator 22A, it is convenient to rotate the radiator 22A approximately 90° about its longitudinal axis when inserting the radiator 22A into the cavity of the mold 24 and, after the foregoing insertion, to return the radiating aperture to the vertical position by again rotating the radiator 22A about its longitudinal axis. The radiator 22A may be tuned by the screw 102 of FIG. 3 and, furthermore, may also be tuned by the use of inductive and capacitive irises, by stubs which are inserted a selectable distance through the outer surface of a waveguide and wedged shaped protrusions on the inner surface of waveguides (not shown) as are taught in text books on microwave circuitry.

Of particular interest is the fact that, as has been noted hereinabove, the tread 34 absorbs a major portion of the electromagnetic energy incident thereupon so that there is little reflection from the interior walls of the mold 24. However, in the event that a relatively low loss material is to be heated within the cavity of the mold 24 or a cavity of some other shape, a relatively small portion of the impinging electromagnetic energy is initially absorbed by the material with the result that intense standing waves of electromagnetic energy develop within the cavity. When the intensity of the electromagnetic waves builds sufficiently such that the electric field is dissipating power within the material contained in the cavity at a rate equal to that at which the energy is being supplied by the radiator 22 or 22A, then equilibrium results and is maintained as the rate of absorption is equal to the rate of delivery of the electromagnetic energy. It is also noted that the rotation of the shaft 50 and the radiator 22 or 22A carries the radiating aperture of the radiator 22 or 22A along the entire tread 34 and thereby uniformly heats the tread 34. In the event that a low loss material rather than the rubber of the rubber tire 36 were placed within the mold 24, then the rotation of the radiator 22 or 22A would also serve the function of rotating the standing wave pattern to uniformly distribute the nulls and intense portions of the standing wave pattern so as to uniformly heat the material. The tuning of the radiator 22 or 22A by the screw 102 or by other ones of the aforementioned tuning devices becomes more critical in the case of the low loss material since the standing wave pattern creates a reactive component to the impedance as seen by the radiator 22 or 22A, which reactive component need be tuned out to effectively raise the intensity of the electric field of the standing waves to effectively dissipate power within the material to accomplish the heating thereof.

It is understood that the above-described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A system for applying radiant energy to a material having a cavity therein comprising:
   a radiator of said energy;
   means for transporting said radiator within said cavity past said material, said transporting means including means for guiding said energy from a point outside said cavity to an interior point of said cavity, said transporting means further including means for coupling the energy from said guiding means to the interior of said radiator; and wherein said radiator is formed of an elongated dielectric member for guiding said energy, within said member, from said coupling means to a radiating aperture of said radiator, the permittivity of said dielectric member being greater than the permittivity of said cavity for reducing the wavelength of radiation within said member as compared to such wavelength in said cavity, a cross-sectional dimension of said member being correspondingly reduced to facilitate the entry of said radiator into said cavity.

2. A system according to claim 1 wherein said coupling means includes means for retracting said radiator to permit its placement within the cavity of said material.

3. A system according to claim 2 further comprising means positioned about said transporting means for supporting bladder means for urging said material into its position about said cavity.

4. A system according to claim 2 wherein said coupling means includes means for tuning said system to couple a maximum amount of power into said material, said tuning means including a shorting plate having an orientation normal to the axis of said guiding means for reflecting the impedance of electromagnetic energy to appear as an open circuit at the surface of said member, said coupling means further including a tuning screw adjustably positionable along the axis of said member.

5. A system according to claim 2 wherein said coupling means includes a quarter-wave choke positioned on an end of said member opposite said radiating aperture, said quarter-wave choke being slidably positioned alongside said coupling means to permit said retracting of said radiator.

* * * * *